April 21, 1970  C. PROCHNOW  3,507,200
PHOTOGRAPHIC CAMERA
Filed Sept. 14, 1967
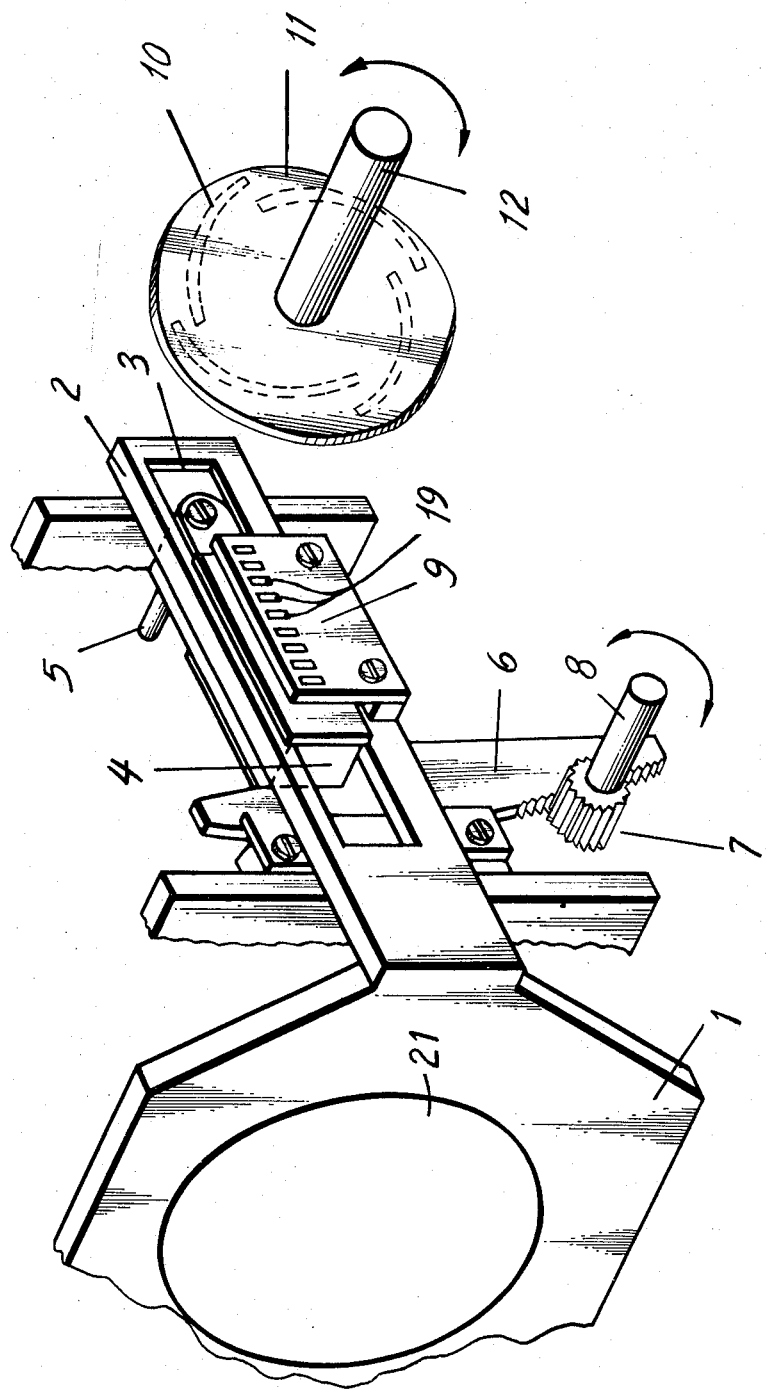

United States Patent Office 3,507,200
Patented Apr. 21, 1970

3,507,200
PHOTOGRAPHIC CAMERA
Claus Prochnow and Richard Weiss, Braunschweig, Germany, assignors to Rollei-Werke Franke & Heidecke, Braunschweig, Germany, a firm of Germany
Filed Sept. 14, 1967, Ser. No. 667,800
Claims priority, application Germany, Sept. 14, 1966, R 44,110
Int. Cl. G03b 5/04
U.S. Cl. 95—51     3 Claims

ABSTRACT OF THE DISCLOSURE

There is disclosed a photographic camera in which the lens is held by a carrier which is mounted for movement backwardly and forwardly, toward and away from the film plane, for purposes of focusing. The carrier is slidable along guide rails which are pivotally mounted on the camera body so as to swing upwardly and downwardly, thereby moving the lens carrier and its lens upwardly or downwardly when it is desired to obtain special photographic effects. The pivotal axis of the guide rails lies in or close to the film plane. Rack teeth projecting laterally from the lens carrier are engaged by spiral ribs on a focusing disk which rotates concentrically with the axis on which the guide rails swing, so that rotation of the disk will move the carrier longitudinally for focusing, and the focusing position is substantially independent of upward or downward swinging of the rails.

BACKGROUND OF THE INVENTION

The present invention, particularly but not exclusively useful in photographic cameras of the single lens mirror reflex type, deals with the backward and forward focusing movement of the lens and also an upward or downward swinging of the lens in order to produce special photographic effects.

In the prior art, various types of displacement of the lens from its normal axial position are known. In some cameras, the lens is mounted on a front member (often called merely a "front") which is capable of movement upwardly and downwardly relative to a bed, as well as forward and backward movement along the bed for focusing purposes, and in some cameras the front member is also tiltable on a lateral or transverse axis which passes through or approximately through the lens. While such constructions may be suitable for studio cameras and press cameras, they are not really suitable or convenient for small hand cameras, particularly for single lens reflex cameras. In such cameras (i.e., small hand cameras, especially single lens mirror reflex cameras) it is customary to have the lens carrier move axially (forwardly and backwardly) along rigid guide rails fixed to the camera body, such movement serving to focus the lens on the film plane, but there has been no convenient way of tilting the lens relative to the film plane, or of raising or lowering the lens relative to the normal optical axis which extends perpendicular to the film plane. The present invention provides a very convenient and compact way for enabling the desired movements of the lens in such a camera.

BRIEF DESCRIPTION OF THE DRAWING

In the accompanying drawing which in incorporated herein by reference and which constitutes a material part of the present disclosure, the single view is an exploded perspective view, with parts broken away, of a lens carrier and its guide rails and associated parts, illustrating a preferred embodiment of the invention.

DESCRIPTION OF THE PREFERRED EMBODIMENT

Except for the parts herein specifically mentioned, the rest of the camera may be of conventional and well known construction commonly found in small hand cameras, particularly single lens mirror reflex cameras, so the main features of such a camera are not shown in the drawing and will, of course, be well understood by those skilled in the art. The camera includes the usual light-tight body, at the forward end of which is mounted a lens carrier 1 equipped with a lens schematically shown at 21. At both sides of the carrier 1, slide rails 2 extend rearwardly, but only one rail on one side of the carrier is illustrated, since the rails and associated mechanism on the two sides of the carrier are reverse duplicates of each other, and a description of the mechanism at one side will serve for both.

Each slide rail 2 of the carrier is longitudinally slotted at 3, and the edges of the slot have snug sliding fit with guide slots in a slide rail or slide block 4 pivotally mounted for upward and downward swinging movement on a journal or pivot 5 which extends transversely with respect to the optical axis, intersecting the optical axis perpendicular thereto. The pivotal axis 5 is preferably in or as close as possible to the film plane so as to maintain a close approximation to the theoretical "Scheimpflug" condition as the lens carrier swings upwardly or downwardly on the pivotal axis 5.

The pivoted slide rails or blocks 4 are provided with external handle means accessible from the outside of the camera body, for swinging these guide rails on their pivots 5 in order to raise or lower the lens carrier 1. Various handle arrangements are possible. One convenient arrangement is to provide each slide rail or block 4 with an arcuate gear segment 6 having rack teeth formed along a curved edge which is concentric with the pivotal axis 5. The gear teeth on the segments 6 mesh with pinions 7 on a cross shaft 8 mounted in the camera body and extending out through a side wall of the body and having an external knob or handle of conventional form, not shown. By turning the shaft 8, the pinions 7 will cause the gear segments 6 (one at each side of the camera) to move upwardly or downwardly as the case may be, thus likewise moving the rails 2 which slide on the rails 4, and thereby moving the lens carrier 1 upwardly or downwardly as the case may be and causing a tilt of the lens 21 relative to the film plane. This inclines the optical axis of the lens.

For moving the lens carrier 1 forwardly and backwardly (sliding the rails 2 longitudinally on the rails or blocks 4) each of the rails 2 is provided with a rack member 9 having rack teeth 19 projecting laterally from the surface of the rack member 9, as illustrated. Meshing with the rack teeth 19 there are spiral ribs 10 arranged in an interrupted manner as illustrated, on the face of a disk 11 fixed to a shaft 12, there being one of these disks 11 at each side of the camera body, for meshing with the rack teeth 19 on the rack 9 on its side of the body. The shaft 12 is in alinement with or coaxial with the pivotal axis 5 on which the blocks 4 swing. As already stated, this pivotal axis 5 (and the axis of the shaft 12) is located as close as possible to the film plane, conveniently being just behind the film plane so that a single pivot 5 can, without obstructing the image, extend across the width of the picture area from the slide block 4 on one side to the corresponding slide block 4 on the other side of the camera, so that the two slide blocks are coupled together. This coupling is, however, not essential if the arrangement of the gear segments 6 and pinions 7 is used, because the two pinions 7, at opposite sides of the camera body, fixed to the same shaft 8, will serve to insure that the side blocks 4 swing upwardly or downwardly to the same extent. With such an arrangement, the two disks 11 (one at each side of the camera) can be fixed to the same shaft 12 which can extend continuously across the width of the camera (just behind the film plane) and this same shaft 12, or a sleeve rotatable on the shaft, can constitute the pivotal support for the rear ends of the two slide rails or slide blocks 4. If the two disks 11 are mounted on two separate shafts 12, instead of on a single shaft, then the two shafts 12 are suitably coupled to each other, by any conventional means which will not interfere with passage of the light rays to the film, so as to turn together. In any event, an end of the shaft 12 extends out through a side wall of the camera body and is provided with an external knob of any conventional known construction, for turning the shaft in order to produce the backward and forward focusing movements of the parts 1, 2, and 9.

Because of the fact that the spirally threaded disks 11 rotate concentrically or at least nearly concentrically with the pivotal axis 5, and of the fact that the spiral threads 10 on these disks have relatively small pitch, it is seen that for any given position of the disks 11, upward or downward swinging of the slide members 2 and 4 will have very little effect on the longitudinal position of the lens carrier 1. Also, it is seen that rotation of the disks 11 will serve to move the lens carrier backwardly or forwardly, as the case may be, regardless of the position to which the slide rails may be swung upwardly or downwardly. In whatever position the slide rails may be, rotation of the disks 11 will cause the spiral teeth 10 on the disks to engage the rack teeth 19 and move the rack members 9 and slide members 2 forwardly or backwardly, as the case may be, depending upon the direction of rotation.

If the lens has been focused before tilting the lens carrier 1 upwardly or downwardly, and it is then decided to tilt it, the upward or downward tilt of a few degrees will have practically no effect on the longitudinal position of the lens carrier, so that in many cases it is not necessary to refocus the camera lens after performing the tilting operation. In some cases, a slight refocusing movement may be desirable, accomplished by slight rotation of the shaft 12 and the disks 11. Because of the relatively small pitch of the threading ribs 10 on the disks 11, there is a favorable transmission ratio in the focusing mechanism, so that very accurate focusing is possible.

It is to be understood that the disclosure is given by way of illustrative example only, rather than by way of limitation, and that without departing from the invention, the details may be varied within the scope of the appended claims.

What is claimed is:

1. A photographic camera including a body containing a film plane, a lens carrier, a first slide rail member fastened to said body, a second slide rail member fastened to said lens carrier and slidable along said first slide rail member to enable said lens carrier to move closer to or farther away from said film plane, said first slide rail member being pivotally mounted on said body to swing on a pivotal axis extending transversely of the optical axis of a lens carried by said carrier, a focusing shaft substantially coaxial with said pivotal axis, and means operated by rotation of said focusing shaft for moving said second slide rail member along said first slide rail member, to move said lens carrier closer to or farther from said film plane.

2. A construction as defined in claim 1, wherein said last named means includes rack teeth on said second slide rail member, and a flat disk having a spiral thread projecting from a face of said disk, said thread meshing with said rack teeth so that rotation of said disk will drive said second slide rail member longitudinally thereby to carry said lens carrier with it.

3. A construction as defined in claim 2, wherein said disk is mounted for rotation about an axis substantially coaxial with said pivotal axis of said first slide member.

References Cited

UNITED STATES PATENTS

| 1,134,522 | 4/1915 | Folmer | 95—51 |
| 2,303,920 | 12/1942 | Drucker | 355—63 |
| 2,789,459 | 4/1957 | May | 355—18 X |
| 3,181,447 | 5/1965 | Keznickl | 95—45 |
| 3,185,058 | 5/1965 | Singer | 95—42 |

FOREIGN PATENTS

| 16,648 | 12/1887 | Great Britain. |

NORTON ANSHER, Primary Examiner

R. W. ADAMS, Assistant Examiner